Dec. 15, 1970    G. KROGER ET AL    3,548,230

MEASURAND TRANSDUCER FOR MEASURING A LENGTH OF YARN

Filed Nov. 5, 1968

United States Patent Office 3,548,230
Patented Dec. 15, 1970

3,548,230
MEASURAND TRANSDUCER FOR MEASURING A LENGTH OF YARN
Gerhard Kroger, Veitsbronn, and Erich Rainer, Nurnberg, Germany, assignors to Siemens Aktiengesellschaft, Munich, Germany, a corporation of Germany
Filed Nov. 5, 1968, Ser. No. 773,533
Claims priority, application Germany, Nov. 16, 1967, S 112,853
Int. Cl. H02k 49/04
U.S. Cl. 310—93      4 Claims

ABSTRACT OF THE DISCLOSURE

A measurand transducer measures the length of yarn moving in contact with a yarn wheel affixed to and rotating with a shaft. The angle of rotation of the shaft is proportional to the length of the yarn. The transducer produces a number of pulses proportional to the angle of rotation of the shaft via a pulse generator. A torque device comprising an eddy current brake in operative proximity with the shaft and the yarn wheel produces an adjustable reaction torque in the shaft to control the rotary speed of the shaft and thereby control the tension in the yarn.

DESCRIPTION OF THE INVENTION

The present invention relates to a measured transducer for measuring a length of yarn, thread, or the like. More particularly, the invention relates to a measurand transducer for measuring the length of yarn moving in contact with a yarn wheel affixed to and rotating with a shaft in a manner whereby the angle of rotation of the shaft is proportional to the length of the yarn, by producing a number of pulses proportional to the angle of rotation of the shaft. The number of pulses produced by the transducer may be suitably counted and thereby indicates the length of the yarn.

Apparatus for measuring the length of yarn utilizes a considerable number of guide pulleys which guide and brake the yarn as it travels through the apparatus. It is advantageous to eliminate such guide pulleys in order to eliminate the mechanical complications arising from their use due to the need for automatic insertion of yarn and knots when the yarn is severed.

The principal object of the present invention is to provide a new and improved measure and transducer for producing a number of pulses proportional to the angle of rotation of a shaft.

An object of the present invention is to provide a new and improved measurand transducer for measuring the length of yarn moving in contact with a yarn wheel affixed to and rotating with a shaft in a manner whereby the angle of rotation of the shaft is proportional to the length of the yarn, by producing a number of pulses proportional to the angle of rotation of the shaft.

An object of the present invention is to provide a new and improved measurand transducer for measuring a length of yarn.

An object of the present invention is to provide a measurand transducer for measuring a length of yarn, which transducer eliminates guide pulleys.

An object of the present invention is to provide a measurand transducer for measuring a length of yarn, which transducer controls the tension in the yarn thereby preventing breakage or severance of the yarn.

In accordance with the present invention, a measurand transducer for producing a number of pulses proportional to the angle of rotation of a shaft includes torque means in operative proximity with the shaft for producing an adjustable reaction torque in the shaft to control the rotary speed of the shaft.

In accordance with the present invention, a measurand transducer measures the length of yarn moving in contact with a yarn wheel affixed to and rotating with a shaft in a manner whereby the angle of rotation of the shaft is proportional to the length of the yarn, by producing a number of pulses proportional to the angle of rotation of the shaft. The transducer includes torque means in operative proximity with the shaft and the yarn wheel for producing an adjustable reaction torque in the shaft to control the rotary speed of the shaft and thereby control the tension in the yarn.

The torque means comprises an eddy current brake. The brake comprises a magnetic circuit having a core of magnetic material with an air gap therein and a brake member comprising electrically conductive material of substantially cylindrical configuration extending from the yarn wheel around the shaft in the air gap of the core.

The air gap of the core is substantially annular and the brake further comprises DC energizing means in operative proximity with the core for magnetizing the core. The core is premagnetized by a permanent magnet. The brake member comprises aluminum. The yarn wheel has an aluminum hub and the brake member is integrally formed with and drawn from the hub.

The core of the magnetic circuit of the torque means surrounds and houses the shaft. A pulse generator produces a number of pulses proportional to the angle of rotation of the shaft. The pulse generator has magnetic means on the shaft rotating therewith for producing a magnetic field. A fixed conductor plate is provided with a Hall device fixedly mounted thereon adjacent the magnetic means in the magnetic field. The magnetic means of the pulse generator is on the end of the shaft opposite the end to which the yarn wheel is affixed and is radially magnetized in a manner whereby the field lines of the magnetic field emerge from the magnetic means substantially radially from the shaft. Ferromagnetic baffle sheets direct the magnetic field to the Hall device. The ferromagnetic baffle sheets have a specific configuration and the conductor plate and baffle sheets comprise means for mounting the baffle sheets in a manner whereby they retain their configuration. Each of the ferromagnetic baffle sheets comprises a sheet metal bent at an angle.

The torque means of the present invention controls the rotary speed of the shaft and thereby controls the tension in the yarn by imposing a maximum limit thereon. This prevents severance of the yarn. The torque means functions as a yarn brake. The yarn brake is an eddy current brake. The eddy current brake has the advantage that the full braking power is first applied when the desired velocity of the yarn has been attained. The yarn brake may be very sensitively adjusted by varying the excitation or energization of the eddy current brake. The eddy current brake itself is simple in structure and does not require additional components of the yarn measuring apparatus. The eddy current brake may be energized at least partially by a permanent magnet in magnetic circuit. The eddy current brake also permits adjustment in either direction, that is, an increase, or decrease, of velocity of the yarn.

In order that the present invention may be readily carried into effect, it will now be described with reference to the accompanying drawing, wherein.

In the figures, the same components are identified by the same reference numerals.

Figure 1:
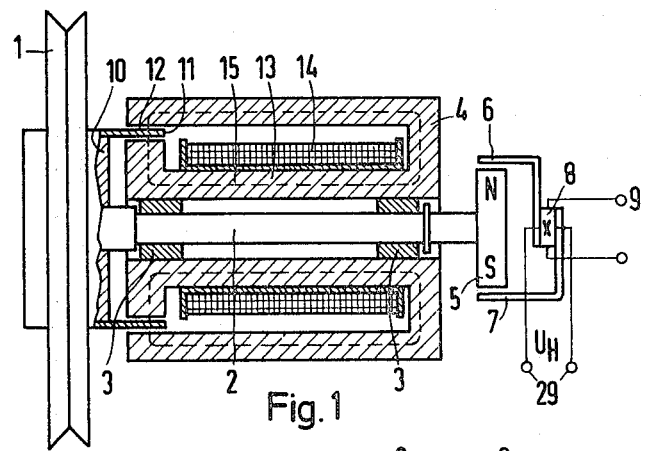
FIG. 1 is a view, partly in section, of an embodiment of the measurand transducer of the present invention for measuring the length of yarn moving in contact with a yarn wheel.

In FIG. 1, a peripherally notched yarn wheel 1 is coaxially affixed to a shaft 2 at one end of said shaft for rotation with said shaft. he yarn wheel 1 may be affixed to the shaft 2 by any suitable means. The yarn, thread, or the like, which is not shown in the figures, moves in contact with the yarn wheel 1 and said yarn wheel is constructed in a manner whereby there is no slippage between said yarn and said yarn wheel. The number of revolutions or the extent of rotation of the shaft 1 is therefore proportional to the length of the yarn moving in contact with the yarn wheel 1.

Figure 3:
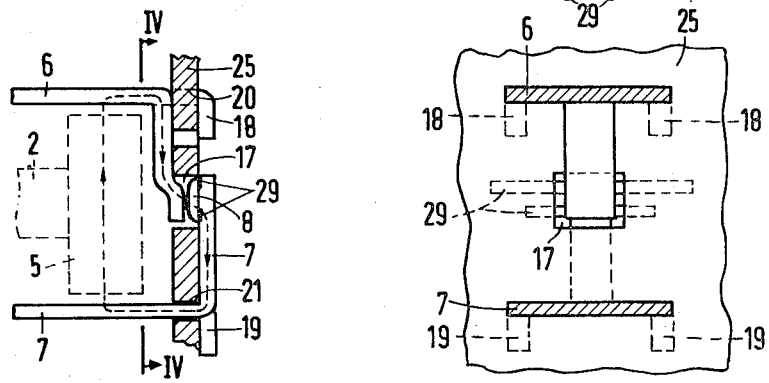
FIG. 3 is a view, partly in section, and in greater detail, of the pulse generator portion of the measurand transducer of FIG. 1, on an enlarged scale.
Figure 4:
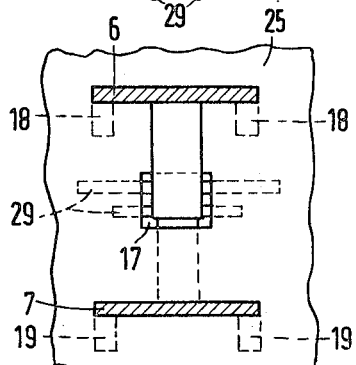
FIG. 4 is a view, partly in section, taken along the lines IV—IV of FIG. 3.
Figure 5:
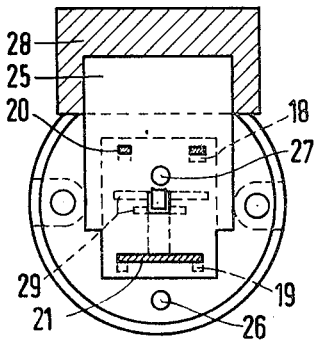
FIG. 5 is a view, partly in section, of the pulse generator of FIGS. 3 and 4.

The shaft 2 is rotatably mounted in a housing 4 by any suitable means such as, for example, bearings 3. Both ends of the shaft 2 extend out of the housing 4. A permanent magnet 5 is affixed to the opposite end of the shaft 2 from that to which the yarn wheel 1 is affixed. The magnet 5 is radially magnetized in a manner whereby the field lines of its magnetic field emerge from said magnet substantially radially from the shaft 2. A pair of ferromagnetic baffle sheets 6 and 7 are mounted on a fixed conductor plate 25 (FIGS. 3, 4 and 5). Each of the baffle sheets 6 and 7 comprises a sheet metal member which is bent at an angle so that it is of essentially L-shaped configuration.

The conductor plate 25 (FIGS. 3 and 5) has openings 20 and 21 formed therethrough in order to mount the ferromagnetic baffle sheets 6 and 7 in a manner whereby they retain their configuration. Thus, punched ears 18 (FIGS. 3 and 5) extend from the baffle sheet 6, pass through the openings 20 formed through the conductor plate 25 and are bent downward on the other side of said conductor plate. Punched ears 19 (FIGS. 3 and 5) extend from the baffle sheet 7, pass through the openings 21 formed through the conductor plate 25 and are bent downward on the other side of said conductor plate. The ferromagnetic baffle sheets 6 and 7 are thereby affixed to the conductor plate 25 in a manner whereby they retain their configuration.

The ferromagnetic baffle sheets 6 and 7 are so positioned (FIGS. 1, 2 and 3) that the baffle sheet 6 is over the permanent magnet 5 and adjacent one side of a Hall device 8 and the baffle sheet 7 is under said magnet and adjacent the opposite side of said Hall device. The Hall device, generator or probe 8 is fixedly mounted in an opening 17 (FIGS. 4 and 5) formed in the conductor plate 25. The Hall device 8 has a pair of current supply terminals 9 (FIGS. 1 and 2) and a pair of Hall voltage output terminals 29.

The ferromagnetic baffle sheets 6 and 7 guide the field lines of the magnetic field produced by the permanent magnet 5 to the Hall generator 8. The ferromagnetic baffle sheets 6 and 7 permit the Hall device 8 to produce Hall voltages or output signals of substantially equal magnitude even when there is considerable axial play of the shaft 2. The Hall voltage output terminals 29 of the Hall generator 8 may be printed on the conductor plate 25 (FIGS. 3, 4 and 5), if desired, thereby eliminating the need for electrical connectors. A connector plug 28 (FIG. 5) may be provided on the conductor plate 25 for providing the operating current for the Hall generator 8 from an outside power source.

Figure 2:
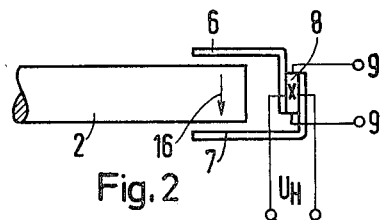
FIG. 2 is a view of a modification of the pulse generator portion of the measurand transducer of FIG. 1.

In order to decrease the volume occupied by the pulse generator, the end of the shaft 2 may be magnetized, as shown in FIG. 2, instead of affixing the permanent magnet 5 to such end. The shaft 2 is radially magnetized, as shown by the arrow 16 in FIG. 2.

The output signals or Hall voltage pulses produced by the Hall generator 8 are proportional in number to the length of the yarn, thread, or the like, in contact with the yarn wheel 1. The Hall voltage pulses may then be supplied to a counter or similar device for indicating their number and thereby indicating the length of the yarn. The counter may be driven by a step motor, rather than directly by the Hall voltage pulses. The step motor may be energized by the Hall voltage pulses and may drive the counter. When the shaft 2 rotates at a high rotary speed, a frequency divider may be connected in series with the step motor in order to reduce its rotary speed.

The components 5, 6, 7 and 8 of FIGS. 1 and 2 and all the components of FIGS. 3, 4 and 5 comprise a pulse generator as disclosed in copending patent application Ser. No. 773,534, filed Nov. 5, 1968 and assigned to the assignee of the present invention.

In accordance with the present invention, the measurand transducer comprises a yarn brake, as shown in FIG. 1. The yarn brake, which is an eddy current brake, functions to provide an adjustable reaction torque in the shaft 2 to control the rotary speed of said shaft and thereby control the tension in the yarn contacting the yarn wheel 1.

The yarn brake comprises a brake member 11 of electrically conductive material of substantially cylindrical configuration extending from the yarn wheel 1 around the shaft 2. The brake member 11 is preferably integrally formed with the yarn wheel 1. Thus, the yarn wheel is provided with a hub 10 comprising, for example, aluminum, and the brake member 11 is drawn from said hub.

The yarn brake also comprises a magnetic circuit having a ferromagnetic core with an air gap 12 formed therein. The housing 4 functions as the core of the magnetic circuit of the yarn brake. The brake member 11 extends from the yarn wheel 1 around the shaft 2 in the air gap 12 of the core. The air gap 12 of the core is substantially annular.

The core is of generally cylindrical configuration having a center axial opening formed therethrough for housing the shaft 2 and having a substantially annular opening formed therein around the axial opening. The annular opening is spaced from the axial opening of the core by a central annular portion 13 of said core. An energizing or exciting winding 14 is wound around the central portion 13 of the core and is housed in the annular opening formed in said core. A direct current is supplied to the energizing winding 14 of the core of the yarn brake to magnetize said core. The core produces magnetic flux, as shown by broken lines 15.

The magnetic flux produced in the core of the magnetic circuit of the yarn brake produces an eddy current in the cylindrical brake member 11, and said eddy current results in a braking effect on the yarn wheel 1. The braking power or force, relative to the velocity of movement of the yarn, is adjustable by variation of the energization current supplied to the energizing winding 14 of the core. The braking force applied to the yarn wheel 1 increases in proportion with the rotary speed of said yarn wheel, and thereby, in proportion with the velocity of the yarn. This results in a control of the rotary speed of the shaft 2 and the yarn wheel 1, and thereby, of the tension in the yarn, so that only unavoidable accelerating forces during the starting process will effect the yarn.

While the invention has been described by means of specific examples and in a specific embodiment, we do not wish to be limited thereto, for obvious modifications will occur to those skilled in the art without departing from the spirit and scope of the invention.

We claim:

1. In a measurand transducer for measuring the length of yarn moving in contact with a yarn wheel affixed to and rotating with a shaft in a manner whereby the angle of rotation of said shaft is proportional to the length of said yarn, by producing a number of pulses proportional to the angle of rotation of said shaft, torque means in operative proximity with said shaft and said yarn wheel for producing an adjustable reaction torque in said shaft to control the tension in said yarn, said torque means comprising a magnetic circuit having a core of magnetic material with an air gap therein and a brake member comprising electrically conductive material of substantially cylindrical configuration extending from said yarn wheel around said shaft in the air gap of said core, the core of the magnetic circuit of said torque means surrounding and housing said shaft, and a pulse generator for producing a number of pulses proportional to the angle of rotation of said shaft, said pulse generator having magnetic means on said shaft and rotating therewith for producing a magnetic field, a fixed conductor plate and a Hall device fixedly mounted on said conductor plate adjacent said magnetic means in said magnetic field.

2. In a measurand transducer as claimed in claim 1, wherein the magnetic means of said pulse generator is on the end of said shaft opposite the end to which said yarn wheel is affixed, said magnetic means is radially magnetized in a manner whereby the field lines of said magnetic field emerge from said magnetic means substantially radially from said shaft, and said pulse generator further comprises ferromagnetic baffle sheets for directing said magnetic field to said Hall device.

3. In a measurand transducer as claimed in claim 2, wherein said ferromagnetic baffle sheets have a specific configuration and said conductor plate and baffle sheets comprise cooperating means for mounting said baffle sheets in a manner whereby they retain their configuration.

4. In a measurand transducer as claimed in claim 3, wherein each of said ferromagnetic baffle sheets comprises a sheet metal bent at an angle.

References Cited

UNITED STATES PATENTS

| | | | |
|---|---|---|---|
| 2,119,819 | 6/1938 | List | 310—93 |
| 2,748,299 | 5/1956 | Weesner | 310—95 |
| 2,767,367 | 10/1956 | Black | 310—93X |
| 2,782,355 | 2/1957 | Wilcox | 310—95X |
| 3,309,642 | 3/1967 | Grancoin | 310—10X |
| 3,151,507 | 10/1964 | Canova et al. | 242—75.51X |
| 3,324,320 | 6/1967 | Evert | 310—95 |

DAVID X. SLINEY, Primary Examiner

U.S. Cl. X.R.

310—10